United States Patent [19]
Ladabaum et al.

[11] Patent Number: 5,870,351
[45] Date of Patent: *Feb. 9, 1999

[54] BROADBAND MICROFABRIATED ULTRASONIC TRANSDUCER AND METHOD OF FABRICATION

[75] Inventors: Igal Ladabaum, San Carlos; Butrus Thomas Khuri-Yakub, Palo Alto, both of Calif.

[73] Assignee: The Board of Trustees of the Leland Stanford Junior University, Palo Alto, Calif.

[ * ] Notice: This patent issued on a continued prosecution application filed under 37 CFR 1.53(d), and is subject to the twenty year patent term provisions of 35 U.S.C. 154(a)(2).

[ * ] Notice: The term of this patent shall not extend beyond the expiration date of Pat. No. 5,619,476.

[21] Appl. No.: 739,446

[22] Filed: Oct. 29, 1996

Related U.S. Application Data

[60] Continuation-in-part of Ser. No. 792,114, Jan. 31, 1997, which is a division of Ser. No. 327,210, Oct. 21, 1994, Pat. No. 5,619,476.

[51] Int. Cl.⁶ .................................................. H04R 23/00
[52] U.S. Cl. ...................... 367/163; 367/174; 381/113; 381/116; 381/174; 381/191
[58] Field of Search ..................................... 367/163, 174; 381/113, 116, 174, 191

[56] References Cited

U.S. PATENT DOCUMENTS

| | | | |
|---|---|---|---|
| 3,715,638 | 2/1973 | Polye | 317/247 |
| 3,736,552 | 5/1973 | Sessler et al. | 340/5 MP |
| 3,786,495 | 1/1974 | Spence | 340/365 |
| 3,946,422 | 3/1976 | Yagi et al. | 357/26 |
| 3,973,146 | 8/1976 | Arnold et al. | 357/26 |
| 4,081,626 | 3/1978 | Muggli et al. | 179/111 R |
| 4,246,449 | 1/1981 | Biber | 179/111 R |
| 4,262,399 | 4/1981 | Cady | 29/25.42 |
| 4,429,192 | 1/1984 | Busch-Vishniac et al. | 179/111 |
| 4,432,007 | 2/1984 | Cady | 357/26 |
| 4,439,641 | 3/1984 | Paglia | 179/111 R |
| 4,439,847 | 3/1984 | Massa | 367/155 |
| 4,530,077 | 7/1985 | Dorr | 367/140 |
| 4,533,795 | 8/1985 | Baumbauer et al. | 179/111 E |
| 4,783,821 | 11/1988 | Muller et al. | 381/173 |
| 4,887,246 | 12/1989 | Hossack et al. | 367/140 |
| 4,887,248 | 12/1989 | Griebeler | 367/181 |
| 4,910,840 | 3/1990 | Sprenkels et al. | 29/25.41 |
| 4,916,675 | 4/1990 | Hoering | 367/155 |
| 4,922,471 | 5/1990 | Kuehnel | 367/181 |
| 5,208,789 | 5/1993 | Ling | 367/181 |
| 5,241,512 | 8/1993 | Argy et al. | 367/1 |
| 5,408,731 | 4/1995 | Berggvist et al. | 29/25.41 |
| 5,619,476 | 4/1997 | Haller et al. | 367/155 |

FOREIGN PATENT DOCUMENTS 892773  10/1953  Germany .

*Primary Examiner*—J. Woodrow Eldred
*Attorney, Agent, or Firm*—Flehr Hohback Test Albritton & Herbert LLP

[57] ABSTRACT

A broadband microfabricated ultrasonic transducer which includes a plurality of resonant membranes of different sizes and/or shapes supported above a conductive substrate.

16 Claims, 7 Drawing Sheets

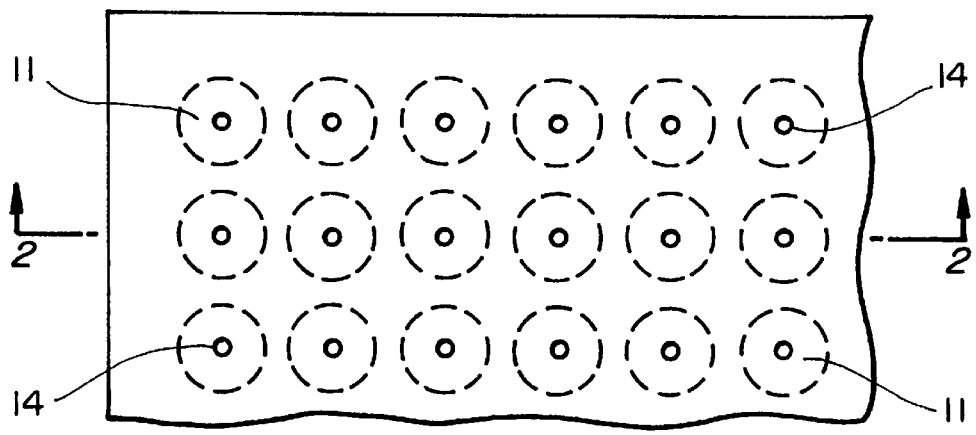
FIG_1
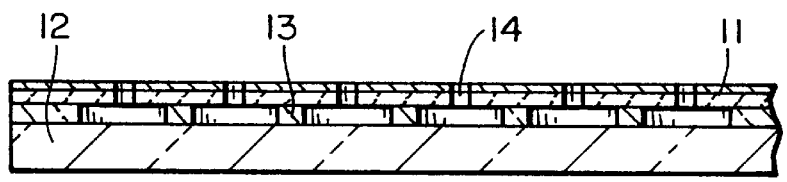
FIG_2
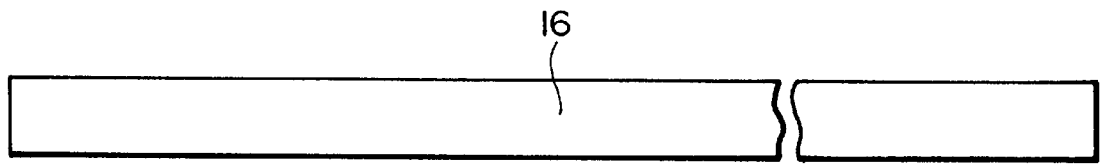
FIG_3A
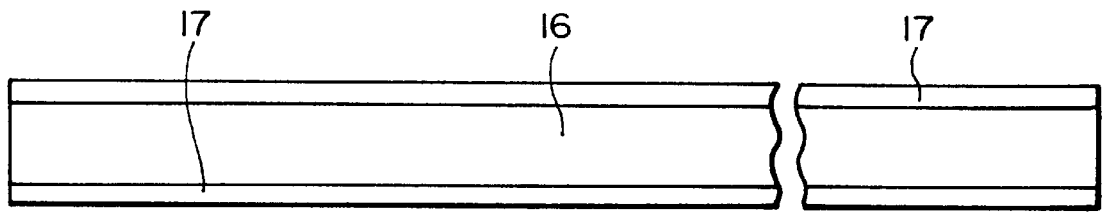
FIG_3B

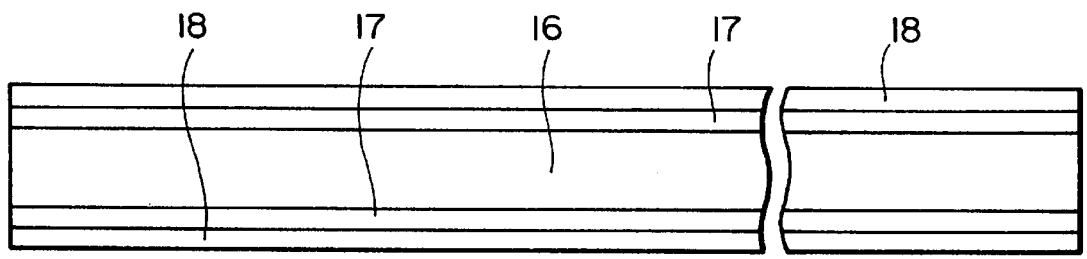
FIG_3C
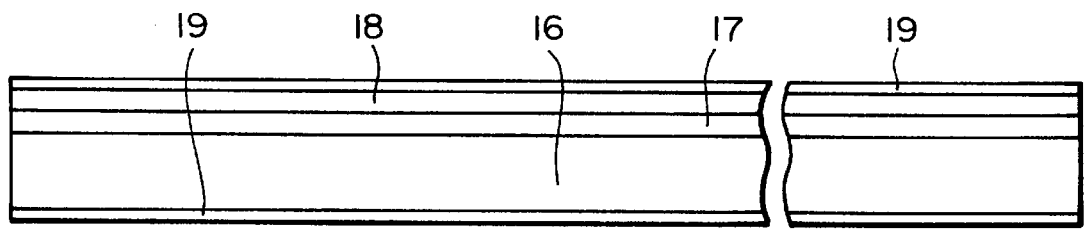
FIG_3D
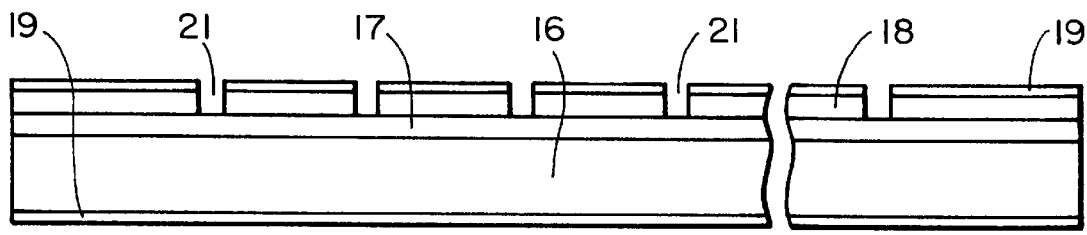
FIG_3E
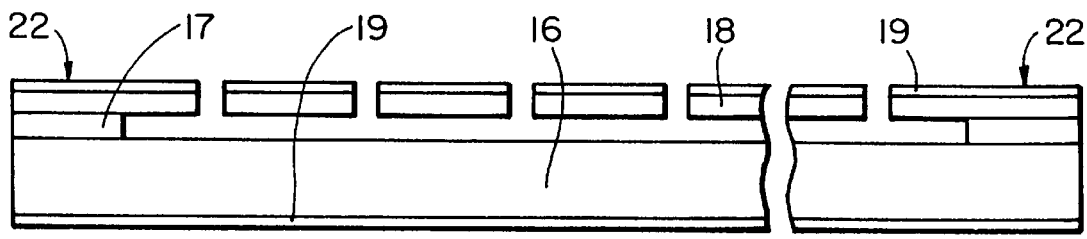
FIG_3F

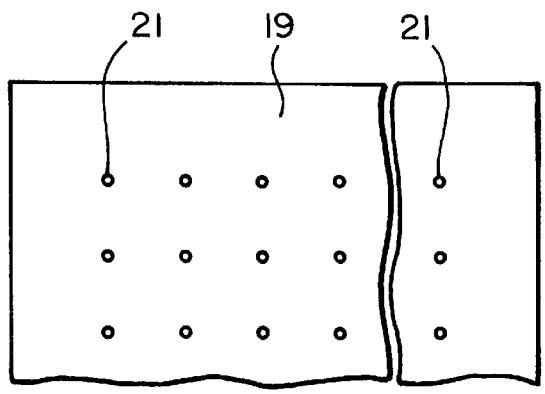
FIG_4A
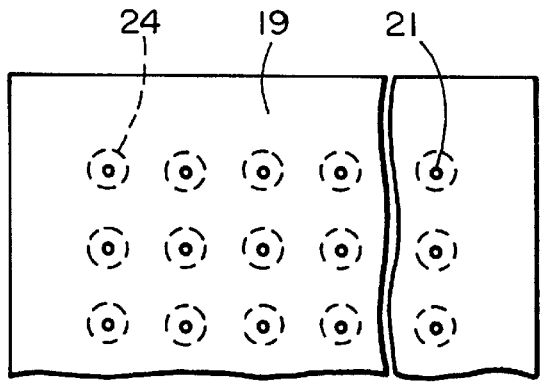
FIG_4B
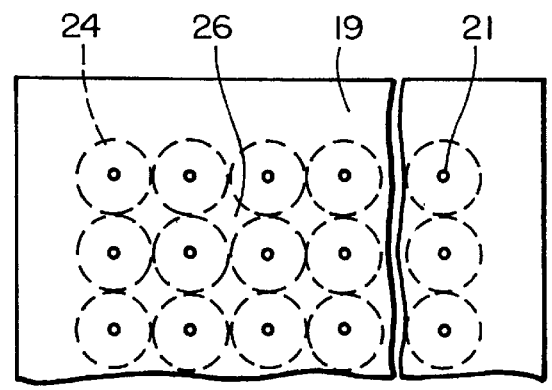
FIG_4C
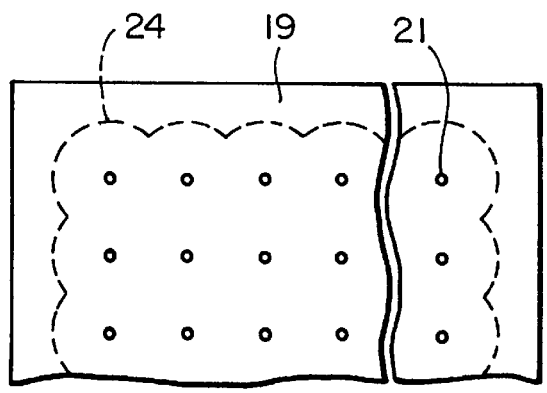
FIG_4D

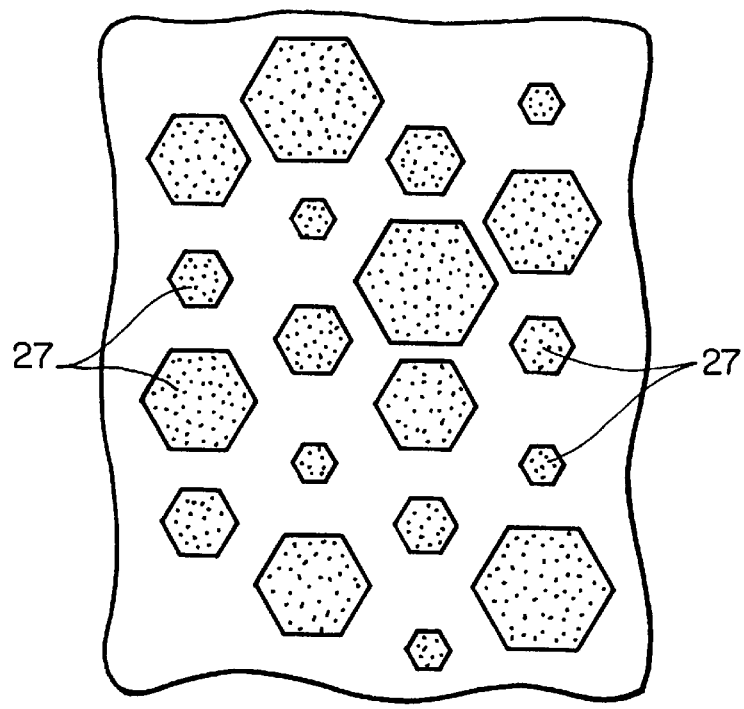
FIG_5
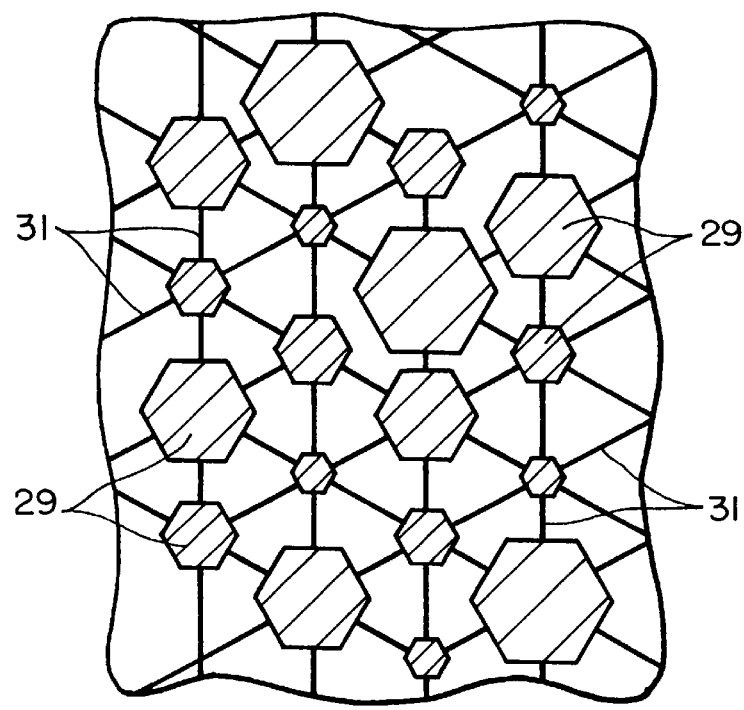
FIG_6

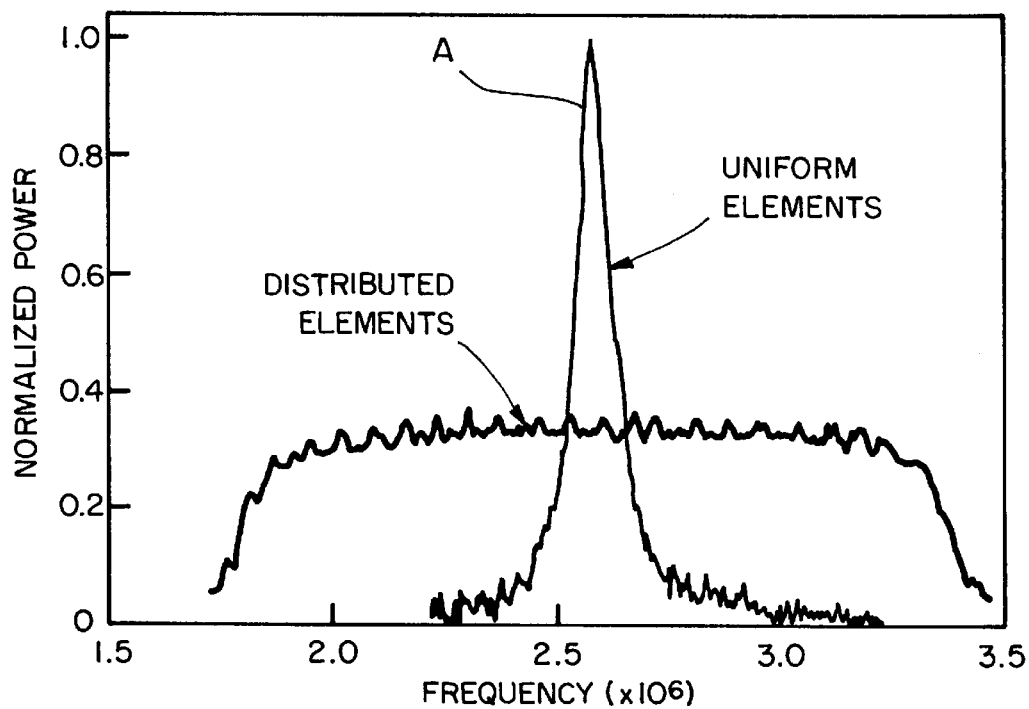
FIG_7
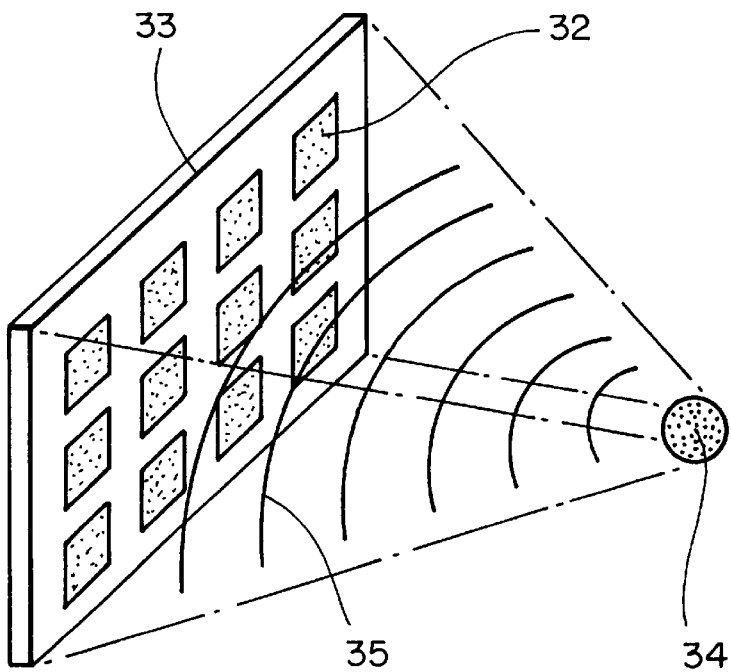
FIG_8

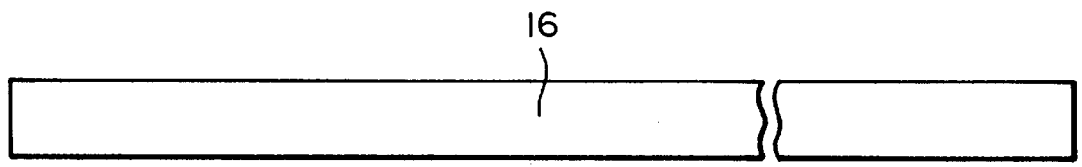
FIG_9A
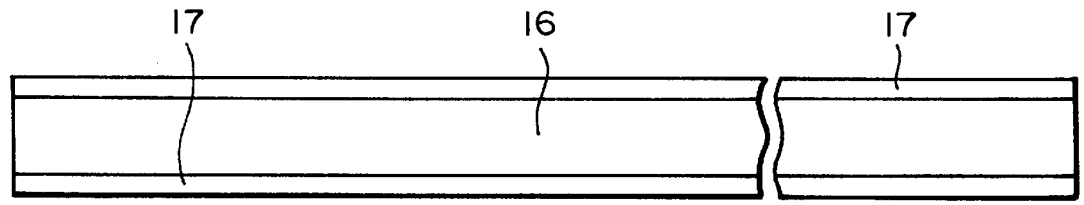
FIG_9B
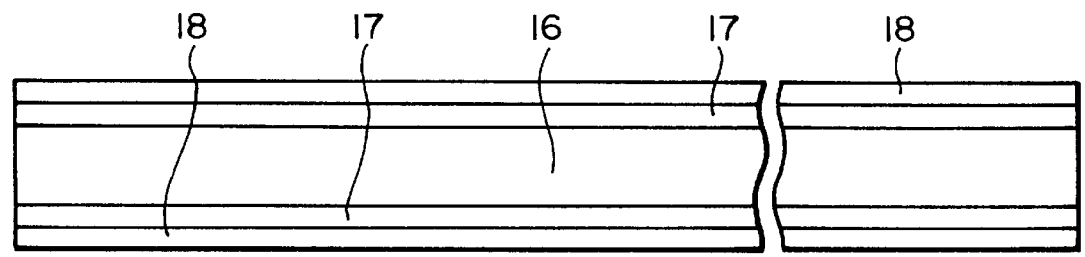
FIG_9C
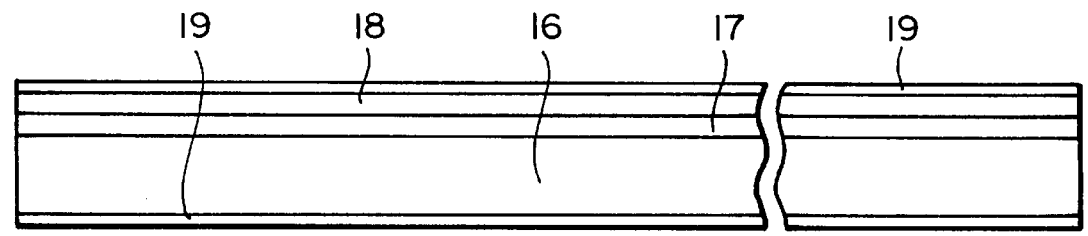
FIG_9D

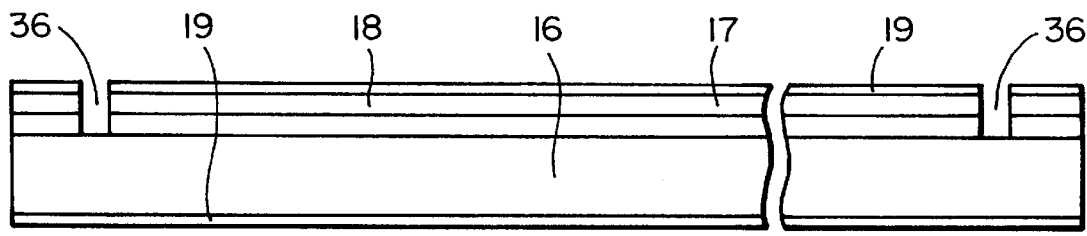
FIG_9E
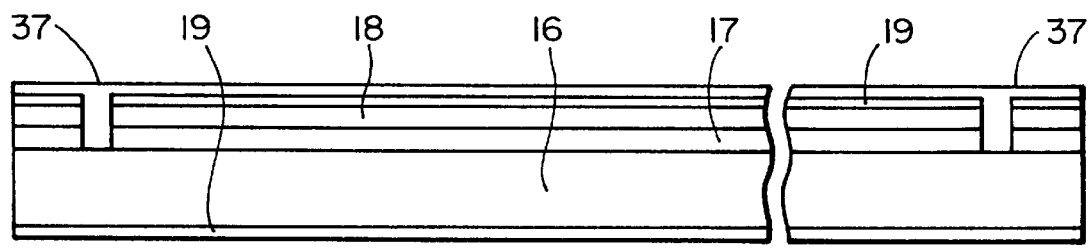
FIG_9F
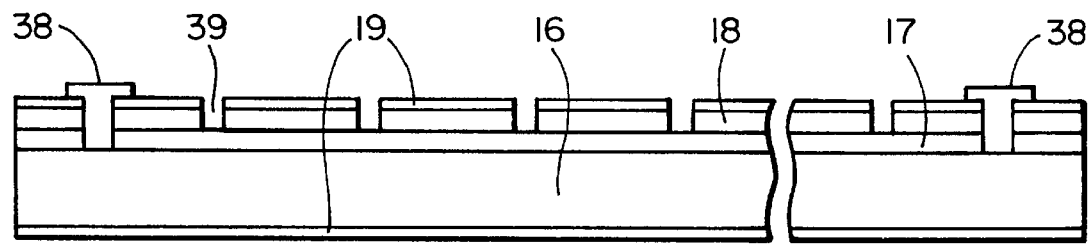
FIG_9G
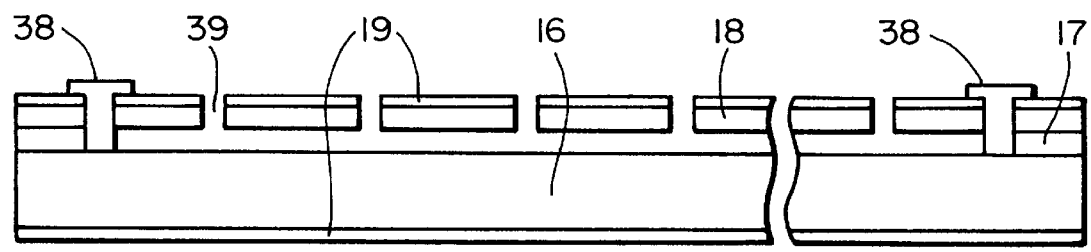
FIG_9H

BROADBAND MICROFABRIATED ULTRASONIC TRANSDUCER AND METHOD OF FABRICATION

This application is a continuation-in-part of application Ser. No. 08/792,114 filed Jan. 31, 1997, which is a divisional of Ser. No. 08/327,210, filed Oct. 21, 1994, now patent 5,619,476.

GOVERNMENT SUPPORT

The aforementioned was made with the United States government's support under Office of Naval Research Contract No. ONR NOO14-94-1-0730. The government has certain rights to this invention.

FIELD OF INVENTION

This invention relates generally to microfabricated ultrasonic transducers and particularly to broadband microfabricated ultrasonic transducers and method of fabrication.

BACKGROUND OF THE INVENTION

An ultrasonic transducer is an electronic device used to emit and receive sound waves at frequencies beyond the human detection limit. Ultrasonic transducers are used in medical imaging, non-destructive evaluation, and robotic sensing among other uses. The most common form of ultrasonic transducers are piezoelectric transducers. Piezoelectric transducers are not efficient in the conversion between electric and acoustic energy in air. The operating frequencies of piezoelectric transducers in air are quite low. Magneto-strictive and capacitive transducers have also been used. These transducers operate in the low MHz range and are narrow band devices.

In co-pending application Ser. No. 08/327,210, filed Oct. 21, 1994, there is a described a narrow band microfabricated ultrasonic transducer. The transducer consists of circular silicon nitride membranes suspended above a heavily doped silicon substrate. FIGS. 1 and 2 schematically illustrate the microfabricated multi-element transducer described in said co-pending application. The transducers include a plurality of identical individual membranes 11 suspended above a silicon substrate 12 by silicon dioxide 13.

Microfabricated ultrasonic transducers efficiently excite and detect airborne ultrasonic waves in that they use thin resilient resonant membranes with very little inertia. The momentum carried by approximately half of a wavelength of air molecules is thus able to set the membrane in motion and visa versa. Electrostatic actuation and detection enable the realization and control of such resonant membranes. When distances are small, electrostatic attractions can exert very large forces on the actuators of interest. Because the membranes forming the multi-element microfabricated ultrasonic transducer described in the copending application are all of essentially the same size, the transducer is inherently a narrow band device as shown by the curve A in FIG. 7.

One of the most important figures of merit of an ultrasonic transducer is the range of frequencies over which it can operate. This range is referred to as the transducer's bandwidth. From Fourier theory, it can be shown that bandwidth is inversely proportional to the time resolution of a device. That is, the broader a transducer's bandwidth, the narrower a time interval it can measure over. For example, a bell is a narrow band device. When it is struck by an object (an event lasting only a very short time) it rings for a relatively long time. Consequently, it is very difficult for a listener, just by hearing the sound of the bell, to determine exactly when the bell was struck. A broader band device, such as a stick, does not ring much and thus allows for finer time discrepancy.

The vast majority of ultrasonic applications consist of mapping the time delay of echoes to spatial coordinates. In short, the precision and resolution of the time measurement capabilities of an ultrasonic system are directly related to the spatial precision and resolution of the system. It is thus clear that for ultrasonic systems ranging from simple position detectors, to gas flow meters, to complex medical imaging equipment, the availability of ultra-broadband devices would constitute a major advance. A secondary advantage to broadband transducers is that even in narrow band applications such as ultrasonic resonance experiments, the same transducers can be used over the frequencies of interest. Currently, a separate transducer is needed to measure at each different frequency of interest.

OBJECTS AND SUMMARY OF THE INVENTION

It is a general object of the present invention to provide a multi-membrane broadband microfabricated ultrasonic transducer and a method of fabrication.

It is another object of the present invention to provide a multi-membrane broadband transducer which has a distribution of individual resonant membranes of various sizes which resonate at different frequencies and to a method of manufacture.

It is a further object of the present invention to provide a microfabricated ultrasonic transducer in which the individual membranes can be optimized for sensitivity, frequency response and power output by varying their size, geometry and thickness.

There is provided a broadband microfabricated ultrasonic transducer which includes a substrate with a plurality of resonant membranes supported and spaced from the substrate via insulating supports. The plurality of membranes include a distribution of membranes of different sizes with each size selected for a particular resonant frequency response.

BRIEF DESCRIPTION OF THE DRAWINGS

The foregoing and other objects of the invention will be more clearly understood from the following description when read in conjunction with the accompanying drawings.

FIG. 1 is a plan view of an ultrasonic transducer having a plurality of membranes of essentially the same size.

FIG. 2 is a sectional view taken along the line 2—2 of FIG. 1.

FIGS. 3A–3F show the steps in the formation of a membrane of predetermined size and frequency response for a multi-element transducer.

FIGS. 4A–4D show the progression of etching of the transducer of FIG. 3.

FIG. 5 is a drawing of a multi-element transducer formed in accordance with the present invention.

FIG. 6 is a view of the transducers of FIG. 5 showing the thin film electrical interconnect.

FIG. 7 shows the frequency response as a function of frequency for two microfabricated ultrasonic transducers having uniform resonant elements and the other distributed resonant elements in accordance with the present invention.

FIG. 8 shows a broadband multi-transducer assembly in which the ultrasonic energy can be focused and scanned.

FIGS. 9A–9H show the steps for forming an element for multi-element transducer in accordance with another process of fabrication.

DESCRIPTION OF PREFERRED EMBODIMENT

The fabrication sequence for microfabricated ultrasonic transducers described in the co-pending application, which is incorporated herein by reference, consists briefly of selecting and cleaning a silicon wafer, forming a thin oxide layer on at least one major surface, and forming a layer of silicon nitride over the oxide layer. The residual stress of the nitride is controlled by changing the proportion of silane to ammonia during the deposition process. The silicon nitride and oxide layers are removed from the other major surface. The wafer is then cleaned and a gold film is evaporated onto both major surfaces of the wafer. A pattern of etched access holes 14, FIGS. 1 and 2, is then transferred to the wafer lithographically followed by a gold and nitride etch. The access holes provide a means by which hydrofluoric acid can pass and etch the underlying sacrificial oxide layer to form a circular membrane supported at its edges. The etch time determines the dimensions of each membrane providing one membrane 11 for each of the access holes 14. The transducer, in accordance with prior art, consisted of a matrix of individual elements or membranes 11, FIG. 1, with selected spacings. As described above, a microfabricated ultrasonic transducer in accordance with the prior art has a narrow frequency response as shown in curve A of FIG. 7.

Similar steps are carried out in the present process with the exception that each membrane is formed by providing a plurality of access holes for the etchant such that all oxide between holes is removed to provide a membrane of predetermined size supported at its edges by the oxide layer. In this manner, by selecting the number, spacing, and location of access holes which are formed, the size and shape of the silicon nitride membrane may be controlled. By appropriately positioning the access holes, a plurality of membranes are formed having different sizes and/or configurations in a single etching step.

Referring to FIGS. 3A–3F and 4A–4H, a highly doped silicon wafer 16, FIG. 3A, is subjected to a wet oxidizing process whereby a thin oxide film, for example, a one micron oxide film 17, is formed on each side of the wafer, FIG. 3B. This is followed by the formation, for example, of a 5,000 Å layer 18 of silicon nitride, FIG. 3C, which is deposited in a low pressure chemical vapor deposition chamber. The residual stress of the nitride is controlled by changing the proportion of silane to ammonia during the deposition process. The oxide and nitride layers are stripped from the bottom of the wafer and the wafer is then provided with, for example, a chrome adhesion layer followed by evaporation of, for example, a 500 Å thick film 19 of gold on major surfaces of the wafer, FIG. 3D. In accordance with the present invention, a plurality of etch holes are formed in the gold and silicon nitride layers. The pattern of etch holes 21 is transferred to the wafer by lithography followed by a gold and nitride etch which leaves a plurality of closely spaced holes of, for example, one micron or less in diameter, extending to the oxide layer 17. The wafer is then subjected to a hydrofluoric acid etch whereby the sacrificial oxide layer 17 is etched to provide an extended membrane supported at its edges 22 by silicon oxide. It is apparent that with the pattern of holes having a different number of holes of different spacing, it is possible to form silicon nitride membranes of different sizes and different configurations. FIGS. 4A–4C show in dotted line 24 the progression of etching through the spaced holes 22 to completion of a perforated membrane, FIG. 4D.

FIG. 5 shows a portion of a multi-element microfabricated ultrasonic transducer 26 in accordance with the present invention. The transducer is formed by defining hexagonal patterns of etch holes to provide hexagonal membranes 27. The number and position of holes defines the size of each membrane 27. FIG. 6 shows a thin film 29 on each membrane and interconnects 31 for making electrical connection to each of the membranes. The transducer response is broadband with the precise frequency response depending on the sizes of each of the distributed membranes 27. Higher frequency response results as the size of the membrane is reduced. The broadband frequency response of one such transducer is shown in FIG. 7.

Transducer elements can have membrane areas which range from 300 to 30,000 $\mu m^2$ with a membrane thickness ranging from 0.1 to 1 $\mu m$, a residual stress in the nitride ranging from 10 to 400 MPa and a gap thickness ranging from 0.1 to 2 $\mu m$. Such elements will resonate from approximately 500, KHz through 12 MHz in air, with approximately a five percent bandwidth. Thus, transducers can be made to operate across a subset of the frequency range if they are comprised of a distribution of different transducer elements.

The hexagonal pattern of membranes is illustrated because it provides a compact multi-element transducer. However, it is clear that the membranes may be round, square, rectangular, triangular, or any other suitable configuration. The important factor is that the membranes be of different sizes to provide broadband frequency response. Membranes of certain shapes, such as rectangular, may resonate at a plurality of frequencies.

A number of individual broadband multi-membrane transducers 32 may be formed on a substrate 33. FIG. 8 shows a two dimensional arrangement of such transducers. The transducers may be independently excited to emit an ultrasonic wave 33 which focuses to a point 34 or to scan the ultrasonic wave. Similarly, the output from each transducer can be processed to receive ultrasound from selected directions and locations.

FIGS. 9A–9H illustrate a further method of defining membranes of different sizes for a multi-element microfabricated ultrasonic transducer. A highly doped silicon wafer is processed to form a sacrificial oxide layer with a silicon nitride layer having selected residual stress and a gold contact layer. The steps 9A–9D are the same as steps 3A–3D and like reference numerals are applied. The gold nitride and oxide layers are then etched to form a groove 36 which will define the shape and size of a respective membrane. For example, a circular groove 36 is formed which extends to the substrate as illustrated in the FIG. 9E. A conformal parylene coating 37 is then applied to the surface and extends downwardly into the groove and in contact with the underlying silicon substrate, FIG. 9F. The parylene is then etched to leave the parylene ring 38. This is followed by masking and etching a plurality of access holes 39 through the gold film and nitride layer within the ring. The oxide is then sacrificially etched leaving a silicon nitride membrane supported and spaced from the substrate by the parylene ring 38. It is apparent that a number of membranes of different sizes and shapes can be formed on a wafer and supported by parylene.

Thus there has been provided a multi-element broadband microfabricated ultrasonic transducer and a method of forming such a transducer having plurality of residual membranes which are responsive to different frequencies to provide the broadband response.

We claim:

1. A broadband microfabricated ultrasonic transducer comprising:

a substrate;

a plurality of resonant membranes of different sizes with each size selected for its resonant frequency supported spaced from the substrate by an insulating support;

and means for applying voltages between said membranes and said substrate.

2. A broadband microfabricated transducer as in claim 1 in which the membrane is silicon nitride having a predetermined residual stress.

3. A broadband transducer as in claim 1 in which the insulating support is silicon oxide.

4. A broadband transducer as in claim 1 in which the insulating support is parylene.

5. A transducer array comprising:

a substrate;

a plurality of ultrasonic transducers on said substrate, each of said transducers including a plurality of resonant membranes of different sizes with each size selected to resonate at a selected frequency or frequencies, said membranes each supported spaced from said substrate by an insulating support;

and means for applying voltages between selected membranes and said substrate whereby to focus and/or scan the ultrasonic energy from said plurality of membranes.

6. A broadband microfabricated transducer as in claim 5 in which the membrane is silicon nitride having a predetermined residual stress.

7. A broadband transducer as in claim 5 in which the insulating support is silicon oxide.

8. A broadband transducer as in claim 5 in which the insulating support is parylene.

9. A broadband transducer as in claims 6, 7, or 8 in which the transducers are in a linear array.

10. A broadband transducer as in claims 6, 7, or 8 in which the transducers are in a two dimensional array.

11. A broadband microfabricated ultrasonic transducer comprising:

a conductive semiconductor substrate;

a plurality of silicon nitride membranes of different sizes with each size selected for its resonant frequency, said membranes supported spaced from said substrate at their edges by an insulating support;

and a conductive film formed on the surface of said membranes whereby a voltage can be applied between said membranes and said conductive semiconductor substrate.

12. A broadband transducer as in claim 11 in which the insulating support is silicon oxide.

13. A broadband transducer as in claim 11 in which the insulating support is parylene.

14. A broadband transducer as in claim 11 in which the membranes have areas which range from 300 to 30,000 $\mu m^2$ and thicknesses which range from 0.1 to 1 $\mu m$, and an insulator support thickness which ranges from 0.1 to 2 $\mu m$.

15. A broadband transducer as in claims 11, 12, 13, or 14 in which the membranes have different shapes.

16. The method of forming a broadband ultrasonic transducer which comprises the steps of:

selecting a semiconductor conductive substrate forming a thin sacrificial insulating layer on one surface of said substrate;

forming a thin silicon nitride layer on the surface of said insulating layer;

forming a number of etchant access holes in said silicon nitride layer, said holes being closely spaced and arranged in patterns each including a plurality of spaced access holes;

etching the sacrificial insulating layer through said access holes for a period of time which etches away the sacrificial material layer to form a membrane at each pattern of holes.

* * * * *